United States Patent [19]

Kosaka et al.

[11] 4,222,351

[45] Sep. 16, 1980

[54] PROCESS FOR REFORMING HYDROCARBON FUEL INTO HYDROGEN-RICH FUEL

[75] Inventors: Katuaki Kosaka, Tokyo; Zene Ueno, Fuchu; Tadahiko Nagaoka, Tokorozawa, all of Japan

[73] Assignee: Nissan Motor Company, Limited, Yokohama, Japan

[21] Appl. No.: 778,940

[22] Filed: Mar. 18, 1977

Related U.S. Application Data

[63] Continuation of Ser. No. 542,018, Jan. 17, 1975, abandoned.

[30] Foreign Application Priority Data

Mar. 6, 1974 [JP] Japan .................................. 49-25914
Mar. 6, 1974 [JP] Japan .................................. 49-25916

[51] Int. Cl.² ............................................ F02B 43/10
[52] U.S. Cl. ...................................... 123/3; 123/1 A; 123/536
[58] Field of Search ............... 123/1 A, 3, 39, 119 E, 123/122 G

[56] References Cited

U.S. PATENT DOCUMENTS

| | | | |
|---|---|---|---|
| 2,057,808 | 10/1936 | Widegren | 123/122 G |
| 2,631,426 | 3/1953 | Jewett | 123/119 E |
| 2,673,069 | 3/1954 | Carpenter | 123/39 X |
| 2,862,482 | 12/1958 | Hart | 123/39 |
| 3,717,129 | 2/1973 | Fox | 123/3 X |
| 3,818,875 | 6/1974 | Phillips et al. | 123/1 A X |
| 3,897,225 | 7/1975 | Henkel et al. | 123/119 E X |
| 3,985,107 | 10/1976 | Ueno et al. | 123/3 |
| 4,004,413 | 1/1977 | Ueno et al. | 123/3 |

*Primary Examiner*—Ira S. Lazarus

[57] ABSTRACT

In the preparation of a gaseous fuel mixture mainly of hydrogen, carbon monoxide and carbon dioxide from a hydrocarbon fuel in the presence of oxygen and water by either the partial combustion process or the catalytic decomposition, the product of catalytic decomposition of an aqueous solution of hydrogen peroxide is utilized as the oxygen and water sources. When a relatively dilute hydrogen peroxide solution is used, the resulting liquid phase water may be separated from the decomposition product and introduced into either the subsequent reaction system or the produced fuel mixture.

11 Claims, 5 Drawing Figures

PROCESS FOR REFORMING HYDROCARBON FUEL INTO HYDROGEN-RICH FUEL

This is a continuation of application Ser. No. 542,018, filed Jan. 17, 1975, now abandoned.

This invention relates to an improved process of reforming a hydrocarbon fuel into a gaseous fuel mixture containing a relatively large amount of hydrogen, which process is particularly suitable to the fuel reforming operations on motor vehicles.

Hydrogen is an advantageous fuel particularly for the cleanness or innoxiousness of its combustion products. It is known that concentrations of noxious substances in an engine exhaust gas is noticeably reduced even when a portion of a usual hydrocarbon fuel fed to the engine is preliminarily converted into a fuel mixture containing a relatively large amount of hydrogen gas.

As is known, hydrocarbon fuels, typically pertroleum fuels such as crude oil, heavy oil and gasoline, can be reformed or converted into differently composed fuel mixtures which contain relatively large amounts of hydrogen gas together with oxides of carbon by reactions with oxygen and water. Heat and/or a catalyst are required for causing such reactions to occur. In the so-called partial oxidation or combustion process, a hydrocarbon is blown into a reaction chamber together with oxygen and steam and subjected to incomplete burning reactions therein. The reactions are generally represented by the following equations.

$$C_mH_n + (m + \tfrac{n}{4})O_2 \longrightarrow mCO_2 + \tfrac{n}{2} H_2O \quad (1)$$

$$C_mH_n + mH_2O \longrightarrow mCO + (\tfrac{2m+n}{2})H_2 \quad (2)$$

$$CO + H_2O \longrightarrow CO_2 + H_2 \quad (3)$$

This process has been in practice as exemplified by the well known Texaco Process, Shell Process and Fauser Process.

In the above reactions, the reaction of the equation (2) is endothermic, but the reactions (1) and (3) are exothermic. When, therefore, the proportions of the hydrocarbon, oxygen and steam are determined appropriately, the reactions can proceed self-sustainingly or autothermically. When octane is taken as an example of the hydrocarbon, the above equations are thermochemically rewritten as follows.

$$C_8H_{18} + \tfrac{25}{2} O_2 \longrightarrow 8CO_2 + 9H_2O \quad (1)'$$
$$\Delta H = -1308 \text{ Kcal}$$

$$C_8H_{18} + 8H_2O \longrightarrow 8CO + 17H_2 \quad (2)'$$
$$\Delta H = +395 \text{ Kcal}$$

$$8CO + 8H_2O \longrightarrow 8CO_2 + 8H_2 \quad (3)'$$
$$\Delta H = -80 \text{ Kcal}$$

(The minus sign for the heat of formation ΔH means evolution of heat, and the plus sign does absorption.) Assume that the reaction of the equation (2)' is exclusively sustained by the heat evolved in the reaction of the equation (1)' (a partial oxidation of the supplied octane) and that 60% of the heat evolved in (1)' is useful for the reaction (2)', then the heat balance is calculated by $$1308 \times 0.6 \div 395 \approx 2$$

The calculation becomes as follows if the subsequent reaction of (3)' is taken into account.

$$1308 \times 0.6 \div (395 - 80) \approx 2.5$$

The results of these calculations mean that 2 to 2.5 moles of octane can be converted into a mixture of hydrogen, carbon monoxide and/or carbon dioxide by burning additional 1 mole of octane. Such yields of the hydrogen-containing fuel mixture allow the above described process to be applied to fuel systems for various engines including those for motor vehicles.

The proportions of the hydrocarbon, oxygen and steam for the above reactions may be varied depending on the hydrogen-carbon ratio of the starting hydrocarbon and/or the carbon monoxide-to-hydrogen ratio of the reaction product, but in industrial practice the values are generally determined as: 0.3 to 1 part by weight of oxygen and 0.3 to 2 parts of steam per 1 part of the hydrocarbon.

A gaseous mixture which is substantially similar to the product of the above described partial combustion process can be obtained also by a conventional catalytic process for the preparation of hydrogen. In this process, a mixture of a hydrocarbon, oxygen and water is exothermically decomposed into a gaseous fuel mixture mainly composed of hydrogen, carbon monoxide and carbon dioxide upon contact with a nickel or lime-base catalyst heated to a temperature of about 800° C. It has been proposed to apply this process to automotive engine fuel systems preferably with the utilization of the engine exhaust gas as a heat source for the heating of the catalyst and/or the water source.

In either the partial combustion or the catalytic process, the supply of pure oxygen and water (or steam) is relatively easy when a relatively large scale apparatus is employed. When, on the other hand, the process is applied to an engine of a motor vehicle, it is practically impossible to use pure oxygen such as liquid oxygen due to its dangerousness. Accordingly, air is used almost exclusively as the oxygen source in the case of a fuel reforming operation on motor vehicles. Since air contains a large amount (about 80%) of nitrogen, the heat capacity of the nitrogen slows down the rate of temperature rise in a reaction chamber and decreases the utilization efficiency of heat for sustaining the reactions. Such adverse effects of the nitrogen result in consumption of an increased amount of fuel and enlargement of the apparatus, both of which are quite unfavorable for motor vehicles. Furthermore, the nitrogen in air remains in the reformed mixture, so that the reformed mixture is not fully satisfactory as an engine fuel and causes the nitrogen oxides concentrations in the engine exhaust gas to increase.

Carriage of a water tank for the fuel reforming is also a burden to motor vehicles. Even when the engine exhaust gas is utilized as the water source, a separate water source must be provided to supply a gap between the required quantity and the water content of the exhaust gas.

It is therefore an object of the present invention to provide an improved process for the preparation of a gaseous fuel mixture of at least hydrogen and carbon monoxide from a hydrocarbon fuel, oxygen and water, which process requires the use of none of liquid oxygen, air and liquid phase water as the starting materials and facilitates a practical application thereof to a fuel system for a relatively small scale powerplant such as an automotive engine.

According to the invention, a substantially gaseous mixture of oxygen and steam which are produced and heated by a catalytic decomposition of hydrogen peroxide is utilized as the oxygen and water sources for the preparation of the above described gaseous fuel mixture from a usual hydrocarbon fuel. The reforming reactions are accomplished by a conventional process. The improvement according to the invention may include the step of separating a portion of the water which is sometimes present in the decomposition product of the hydrogen peroxide solution as the liquid phase. The separated water may be re-cycled into the reaction system during the subsequent reactions between the gaseous decomposition product of the hydrogen peroxide and the hydrocarbon fuel, or may alternatively be admixed with a hydrogen-containing fuel mixture produced by the reforming reactions.

The improvement according to the invention has the advantages mainly that practically pure oxygen and water are supplied from a single starting material, which is less dangerous than liquid oxygen, and that the oxygen and water are obtained in the form of a substantially gaseous mixture which is at an elevated temperature. Due to these fundamental advantages, the invention brings about improvements on the heat balance and fuel consumption in the reforming reactions.

The features and advantages of the invention will be fully understood from the following detailed description with reference to the accompanying drawings, in which.

Figure 1:
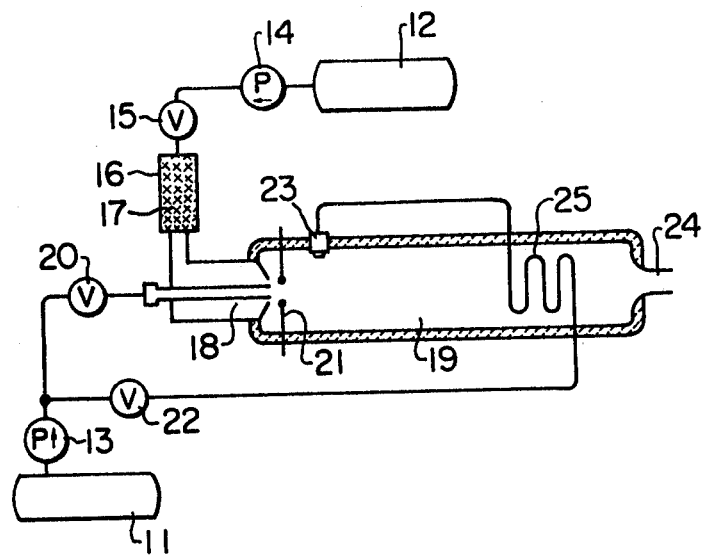
FIG. 1 is a diagram of a system for carrying out a process of the invention based on a conventional process for the partial combustion of a mixture of a hydrocarbon fuel, oxygen and water.

As is known, hydrogen peroxide or an aqueous solution thereof can be decomposed into oxygen and water upon contact with, e.g., a silver or nickel-base catalyst, and the decomposition products are obtained as a heated and substantially gaseous mixture since the decomposition reaction is exothermic. The oxygen-to-water ratio of the obtained mixture can be varied over a wide range as shown in the following table with the variation in the concentration of the starting aqueous solution.

| $H_2O_2$ Concentration (Wt. %) | Composition of product mixture (Wt. %) | | Ratio of $O_2/H_2O$ (by Wt.) | Temperature of product mixture (° C. approx.) |
| --- | --- | --- | --- | --- |
| | $O_2$ | $H_2O$ | | |
| 90 | 42.4 | 57.6 | 0.736 | 750 |
| 70 | 32.9 | 67.1 | 0.490 | 270 |
| 50 | 23.5 | 76.5 | 0.307 | 230 |
| 30 | 14.1 | 85.9 | 0.164 | 150 |
| 10 | 4.7 | 95.3 | 0.049 | 100 |

The hydrogen peroxide concentration in the initial solution may be selected depending on the composition of the hydrocarbon fuel and/or the intended composition of the reformed fuel mixture. In application of a process of the invention to a fuel system of an ordinary motor vehicle engine, the hydrogen peroxide concentration lies preferably in the range between about 30% and about 50% taking into account the oxygen-to-water ratio of the decomposition product as well as the safety of the solution. The elevated temperature of the decomposition product allows a preliminary heating of a reaction chamber or a catalyst therein for reacting the decomposition product with a hydrocarbon fuel to be noticeably lessened.

The oxygen-water mixture prepared by the decomposition of hydrogen peroxide can be directly mixed with a hydrocarbon fuel to reform the resulting mixture into a gaseous fuel mixture of mainly hydrogen, carbon monoxide and carbon dioxide. The reforming may fundamentarily be accomplished according to any of the conventional processes. The process according to the invention is particularly suitable for reforming gasoline, kerosene or alcohols. The following examples are presented to illustrate the invention more practically together with explanation of various systems for carrying out a process according to the invention.

EXAMPLE 1

In a system shown in FIG. 1, a hydrocarbon fuel (hereinafter will be referred to simply as fuel), which was gasoline in this case, and a 50% aqueous solution of hydrogen peroxide were separately supplied from a fuel tank 11 and a hydrogen peroxide tank 12 by means of a first pump 13 and a second pump 14, respectively. When a first valve 15 was opened, the hydrogen peroxide solution was supplied to a catalyst chamber 16 containing therein a silver net as a catalyst 17 and decomposed into a heated first mixture of oxygen gas and steam. Alternatively, cupric oxide pellets may be used as the catalyst 17. The first mixture was fed to a burner 18 of a reaction chamber 19. Then a second valve 20 was opened to cause a minor amount of the fuel to jet into the reaction chamber 19 from the burner 18 together with the first mixture. The reaction chamber 19 was equipped with a spark plug 21 to ignite the jets of the first mixture and fuel. The spark plug 21 is not required to generate sparks continuously since the once-ignited jets undergo the exothermic or autothermic reaction of the equation (1). When the reaction chamber 19 was heated to a predetermined temperature, usually about 1200° C., by this reaction, a third valve 22 was opened to feed a major amount of the fuel into a high temperature atmosphere of the reaction products in the reaction chamber 19 from a nozzle 23. The fuel from the nozzle 23 was decomposed by the heat and steam as shown by the equations (2) and (3), and the resulting mixture, which contained a relatively large amount of hydrogen gas and oxides of carbon, was discharged from the reaction chamber 19 through a discharge port 24. The fuel is preferably preheated by passing through a heat exchanger 25 disposed in the reaction chamber 19.

The fuel injection rate from the burner 18 is preferably regulated such that the quantitative ratio of the oxygen to the fuel is approximately stoichiometric based on the equation (1) in order to maintain the reaction atmosphere at a temperature as high as possible.

When gasoline is used as in this Example, preferably about 1.4 parts by weight of oxygen is mixed with 1 part of the fuel (based on a calculation wherein gasoline is represented by $C_8H_{16}$). In this Example, the gasoline and the hydrogen peroxide solution (50%) were supplied from the respective tanks 11 and 12 at the rates of 1 g/sec and 6 g/sec, respectively. The reformed mixture in this Example was analyzed after dehydration, and the following values were obtained. $H_2$: 54.5%, CO: 27.3% and $CO_2$: 18.2% (by volume).

The discharge port 24 may be throttled to keep the reaction chamber 19 at an increased pressure and thereby to enhance the efficiencies of the reactions therein.

EXAMPLE 2

Figure 2:
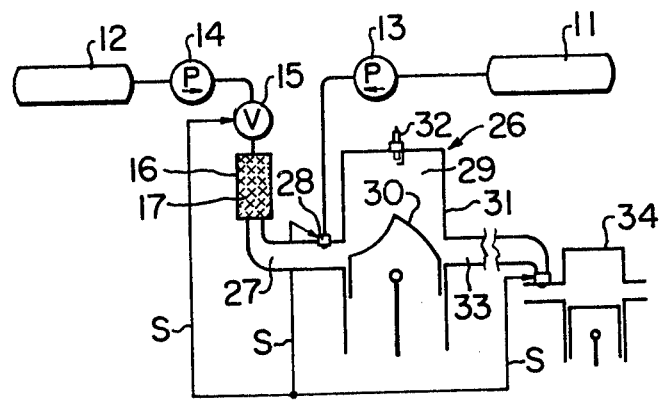
FIG. 2 is a diagram of a system fundamentarily similar to that of FIG. 1, but showing a modification of the reaction chamber of the system.

In this example, a two-stroke cycle reciprocating internal combustion engine 26 shown in FIG. 2 was utilized for accomplishing the fuel conversion reactions as described in Example 1. When the first valve 15 was opened, the hydrogen peroxide solution was supplied to the catalyst chamber 16 to feed the first mixture into an induction passage 27 of the engine 26. The fuel was injected into the induction passage 27 from a fuel nozzle 28. The induction passage 27 was communicable in a usual manner with a combustion chamber 29 defined above a piston 30 in a cylinder 31. The combustion chamber 29 was equipped with a conventional spark plug 32 and was communicable with a discharge passage 33, which served at the same time as a fuel induction passage of a separate main engine 34. The communication of the combustion chamber 29 with the induction passage 27 and the discharge passage 33 was controlled in usual manners by intake and exhaust valves (not shown). The mixture of the fuel and the first mixture was drawn into the combustion chamber 29 on a downward stroke of the piston 30 and compressed therein to a pressure of about 20 to 30 kg/cm² on the subsequent upward stroke of the piston 30. At the end of this upward stroke, the spark plug 32 produced a spark to ignite the compressed mixture. A portion of the fuel in the mixture was burned or oxidized as represented by the equation (1) and the remaining portion of the fuel was converted into hydrogen and oxides of carbon through the reactions of the equations (2) and (3). The reaction product gases did the work of pushing down the piston 30 before being discharged from the combustion chamber 29 into the discharge passage 33. The feeding rates of the fuel and the first mixture into the induction passage 27 were regulated by controlling the fuel nozzle 28 and the hydrogen peroxide valve 15 in response to a signal S representing the feed rate of the reformed mixture to the main engine 34.

The system in this example has the advantages that the reformed mixture per se generates a power for pressurizing the mixture of the reactants and that the temperature of the reformed mixture is reduced by the expansion thereof in the combustion chamber 29 prior to the feeding to the main engine 34.

When a relatively dilute, e.g. below 50% by weight, hydrogen peroxide solution is used in a process according to the invention, the gaseous first mixture resulting from the decomposition of the hydrogen peroxide solution tends to contain a portion of the water as liquid due to the drop in the decomposition reaction temperature. If, for example, a 30% aqueous solution of hydrogen peroxide is used, the decomposition product consists of about 14% of oxygen and about 86% of water as shown in the above Table, and a great majority of the water is present as liquid phase. Consequently, the fuel sometimes may not be burned or decomposed steadily when reacted with the first mixture in such a state, especially when the reforming of a large portion of the fuel is intended compared with the amount of the fuel for direct reaction with the first mixture.

The liquid phase water in the first mixture, therefore, is preferably separated therefrom and utilized separately. According to one aspect of the invention, the separated water is used in the reactions of the equations (2) and (3) while the remaining portion of the first mixture, which substantially consists of oxygen alone, is used to initiate and sustain the reaction of the equation (1) continuously and steadily, so that a sufficient amount of heat is produced. The liquid phase water as well as the fuel is preferably preheated by subjecting to heat exchange with the hot reformed mixture so that the efficiencies of the reforming reactions may be enhanced and the temperature of the reformed mixture may be reduced prior to the feeding into an engine. In another aspect of the invention, the separated water is mixed with the reformed fuel mixture to reduce the mixture temperature and/or to increase the carbon monoxide content of the mixture. The following two examples illustrates the separation and utilization of the liquid water.

EXAMPLE 3

Figure 3:
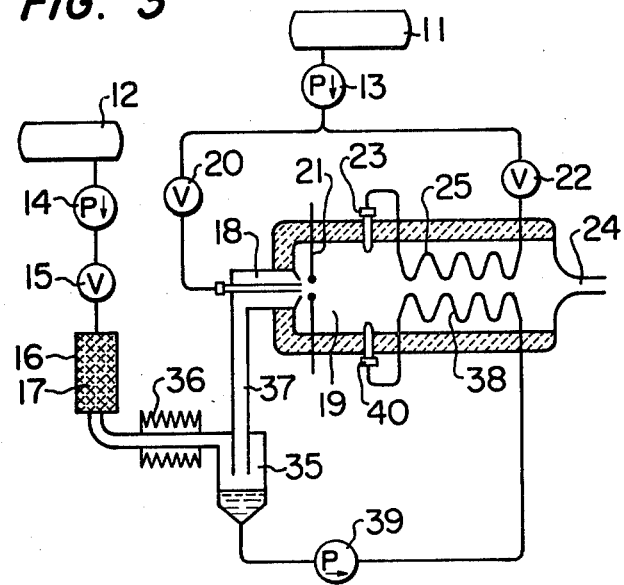
FIG. 3 is a diagram of a system fundamentarily similar to that of FIG. 1, but having additional apparatus for separating liquid phase water from the oxygen-water mixture produced by the decomposition of hydrogen peroxide.

FIG. 3 shows a system which is fundamentarily similar to one of FIG. 1 except for the addition of a sub-system for the separation and treatment of the liquid water contained in the first mixture. In this system, the catalyst chamber 16 for the decomposition of the hydrogen peroxide solution from the tank 12 is not directly connected to the burner 18, but to a vapor-liquid separator 35 preferably through a cooler 36. The oxygen and steam in the first mixture are discharged from the separator 35 and supplied to the burner 18 through a duct 37 to burn a portion of the fuel supplied from the tank 11. The liquid phase water is passed through a heat exchanger 38 disposed in the reaction chamber 19 by means of a pump 39 and injected into the reaction chamber 19 from the water nozzle 40. The injected water reacts with the major portion of the fuel, which is injected into the reaction chamber 19 from the fuel nozzle 23 through the third valve 22.

EXAMPLE 4

Figure 4:
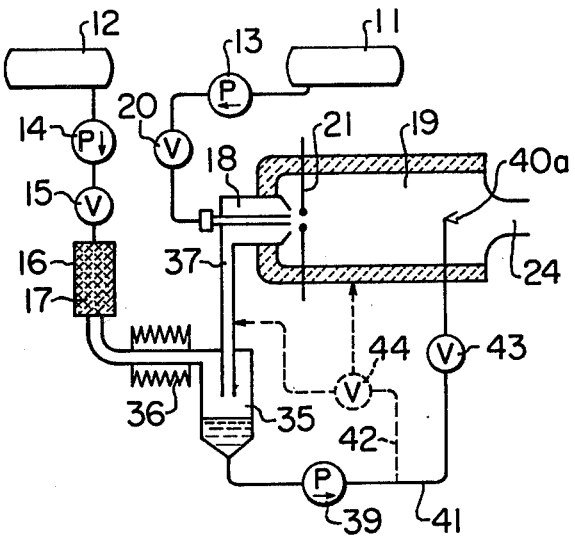
FIG. 4 is a diagram of a system fundamentarily similar to that of FIG. 3, but utilizing the separated water in a different manner.

In this example, the first mixture from the catalyst chamber 16 is flown into the separator 35 to supply only the gaseous components to the burner 18 in the same manners as in Example 3. In a system shown in FIG. 4, however, the entire fuel from the tank 11 is fed to the burner 18 through the second valve 20. As a result, a portion of the fuel undergoes the oxidation reaction of the equation (1) and the remaining portion is decomposed according to the equations (2) and (3). The separated water is introduced into the resulting hydrogen-containing mixture by means of a water nozzle 40a, which is disposed in the reaction chamber 19 at a location relatively close to the discharge port 24, or in other words out of the region in which the reforming reactions take place. A portion of the liquid phase water may be fed to either the burner 18 or the reaction zone of the reaction chamber 19 by the provision of an auxiliary conduit 42, which is branched from a water conduit 41 at a location between the pump 39 and the nozzle 40a, and control valves 43 and 44 as shown by phantom lines in FIG. 4.

In the process of this example, the oxidation of carbon monoxide by the reaction of the equation (3) is somewhat suppressed due to the shortage of water in the reacting system, resulting in decrease in the evolution of heat in this reaction. Consequently the temperature of the converted mixture is lowered even before the injection of the liquid phase water from the nozzle 40a. The use of the reformed mixture obtained by the process of this example allows an engine to work at improved efficiencies due to a moderate temperature and a high carbon monoxide content of the reformed mixture.

Furthermore, the process of this example as well as one of Example 3 has another advantage that the use of the reformed mixture therefrom as a fuel for an internal combustion engine can prevent the occurrence of an excessively violent combustion in the engine and suppress the production of nitrogen oxides because of the presence therein of steam, which has a relatively large specific heat.

EXAMPLE 5

Figure 5:
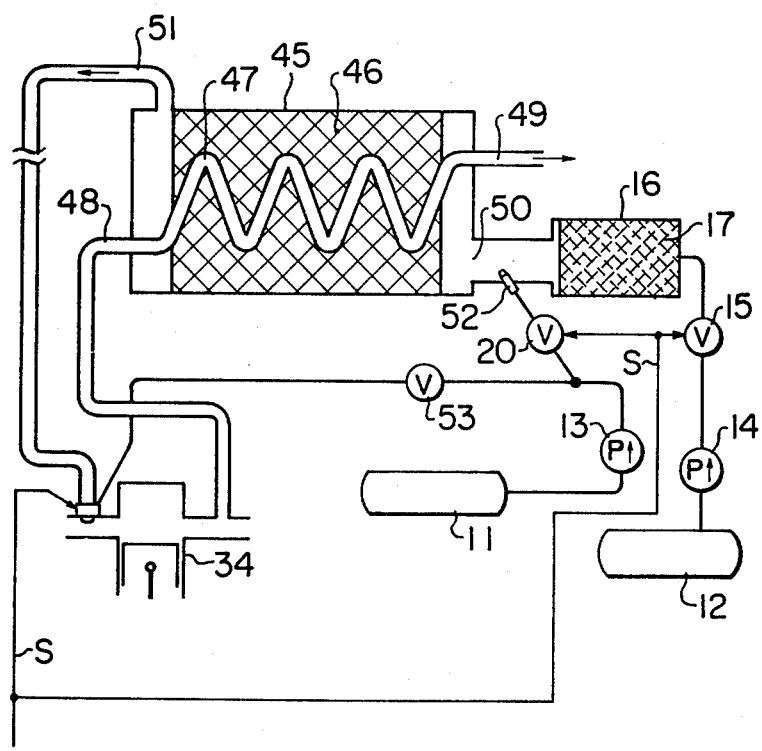
FIG. 5 is a diagram of another type of system for carrying out a process of the invention based on a conventional process for the catalytic reactions of a mixture substantially similar to one employed in the system of FIG. 1.

This example is concerned with a process for the fuel conversion by catalytic reactions. In a system shown in FIG. 5, the hydrogen peroxide line from the tank 12 to the catalyst chamber 16 is identical with that in the above examples. In place of the burner 18 and the reaction chamber 19 for burning at least a portion of the fuel, this system has another type of reaction chamber 45, in which a catalyst 46 is enclosed. The catalyst 46 is selected from conventional nickel catalysts, which are capable of converting a mixture of gaseoline or kerosene, oxygen and water into a mixture substantially similar to the products of the reactions of the equations (2) and (3) at about 900° C. When the fuel is an alcohol such as methanol, another type of known catalyst such as a mixture of chromium oxide and zinc oxide is used, and the reactions occur at a lower temperature. The reaction chamber 45 is provided with a heat exchanger 47 to heat the catalyst 47. An inlet 48 of the heat exchanger 47 is communicable with a hot fluid source. In the system of FIG. 5, the exhaust system of the separate engine 34 serves as such a source. An inlet 50 of the reaction chamber 45 communicates with the catalyst chamber 16, and an outlet 51 communicates with another system, e.g. the engine 34. The fuel line, which is arranged in a similar manner as in the above examples, terminates at a fuel injection nozzle 52 located close to the inlet 50 of the reaction chamber 45. When this fuel reforming system is associated with the engine 34, the fuel line may be arranged to supply a portion of the fuel from the tank 11 to the engine 34 through a valve 53.

The chromium oxide-zinc oxide catalyst 46 in the reaction chamber 45 was preliminarily heated to about 400° C. by passing therethrough a hot fluid such as the exhaust gas from the engine 34. Then the aqueous solution of hydrogen peroxide was supplied from the tank 12 to the catalyst chamber 16, and methanol from the tank 11 was injected from the nozzle 52. Consequently, the first mixture of oxygen and water flowed from the catalyst chamber 16 into the reaction chamber 45 together with the injected fuel. Upon contact with the heated catalyst 46 in the reaction chamber 45, the fuel and the first mixture were converted into a gaseous mixture mainly of hydrogen, carbon monoxide and carbon dioxide and discharged from the outlet 51 into, e.g., the engine 34. Similarly to Example 2, the feed rates of the fuel and the first mixture to the reaction chamber 45 are preferably controlled in response to the signal S, which is originally given to the engine 34 to control the rate of the fuel (the mixture from the reaction chamber 45) feed thereto.

It is merely a matter of choice whether a portion of the fuel in the tank 11 is directly utilized or not. It is permissible to supply the entire or an excessive amount of the fuel to the reaction chamber 45 so that unreacted fuel may be present in the mixture discharged from the outlet 51.

As a modification of this example, the catalyst 46 in the reaction chamber 45 may be mixed with the catalyst 17 for the decomposition of hydrogen peroxide, so that the catalyst chamber 16 is omitted and both the fuel and the hydrogen peroxide solution are directly injected into the reaction chamber 45.

What is claimed is:

1. In a process of reforming a hydrocarbon fuel into a gaseous fuel containing as major components thereof hydrogen and carbon monoxide by making the hydrocarbon fuel react with oxygen and water at an elevated temperature on a motor vehicle and feeding an internal combustion engine serving as the power plant of said vehicle with said gaseous fuel, the improvement comprising utilizing a substantially gaseous mixture of oxygen and steam produced and heated by catalytic decomposition of hydrogen peroxide as a sole source of the oxygen and water for the reforming reaction.

2. The improvement according to claim 1, wherein said hydrogen peroxide is subjected to said catalytic decomposition in the form of an aqueous solution thereof.

3. The improvement according to claim 2, wherein the concentration of hydrogen peroxide in said solution is in the range between 30% and 50% by weight.

4. In a process of reforming a hydrocarbon fuel into a gaseous fuel containing as major components thereof hydrogen and carbon monoxide by making the hydrocarbon fuel react with oxygen and water at an elevated temperature on a motor vehicle and feeding an internal combustion engine serving as the power plant of said vehicle with said gaseous fuel, the improvement comprising the steps of:
   (a) preparing a first mixture of oxygen and water by catalytic decomposition of an aqueous solution of hydrogen peroxide, said first mixture being substantially gaseous and at an elevated temperature;
   (b) mixing said first mixture with a hydrocarbon fuel in a reaction chamber in such a proportion that the quantitative ratio of oxygen in said first mixture to the mixed hydrocarbon fuel is approximately stoichiometric for complete oxidation of the hydrocarbon fuel;

(c) igniting the mixture of said first mixture and said hydrocarbon fuel to initiate an oxidation reaction; and (d) supplying additional hydrocarbon fuel to said reaction chamber in a quantity larger than the quantity of the hydrocarbon fuel into said reaction chamber in step (b) such that the additional hydrocarbon fuel mixes with the reaction product of said oxidation reaction while said reaction product is at an elevated temperature and substantially entirely reacts with water in said reaction chamber to give said gaseous fuel.

5. A process according to claim 4 wherein said hydrocarbon fuel is gasoline, the quantity of the gasoline additionally supplied in step (d) relative to said reaction product being such that the weight ratio of the total gasoline supplied to said reaction chamber to the oxygen in said first mixture introduced into said reaction chamber in step (b) is about 1:1.4.

6. A process according to claim 4, further comprising the step of separating a portion of said water in said first mixture, said portion being present as liquid phase, from said first mixture between said steps (a) and (b).

7. A process according to claim 6, further comprising the step of supplying said portion of water to the reacting mixture of said first mixture and said hydrocarbon fuel during said step (d).

8. A process according to claim 7, further comprising the step of heating said portion of water by means of a heat exchanger disposed in said elevated temperature atmosphere before being supplied to said reacting mixture.

9. A process according to claim 6, further comprising the step of mixing said portion of water with said gaseous fuel mixture after said step (d).

10. A process according to claim 4, further comprising the steps of: compressing the mixture of said first mixture and said hydrocarbon fuel in said reaction chamber between said steps (b) and (c); and expanding said gaseous fuel mixture in said reaction chamber after said step (d) such that the temperature of said gaseous fuel mixture is reduced and that the expansion of said gaseous fuel mixture serves as a power source for the compression.

11. A process according to claim 4, further comprising the steps of: feeding said gaseous fuel mixture to an internal combustion engine; and regulating the supply rates of said first mixture and said hydrocarbon fuel in said step (b) in dependence of the feed rate of said gaseous fuel mixture to said engine.

* * * * *